(12) United States Patent
Kim et al.

(10) Patent No.: US 9,953,579 B2
(45) Date of Patent: Apr. 24, 2018

(54) ACOUSTO-OPTIC ELEMENT ARRAY, DISPLAY APPARATUS INCLUDING AN ACOUSTO-OPTIC ELEMENT ARRAY AND METHOD FOR DRIVING AN ACOUSTO-OPTIC ELEMENT ARRAY

(71) Applicant: SAMSUNG ELECTRONICS CO., LTD., Suwon-si (KR)

(72) Inventors: Hojung Kim, Suwon-si (KR); Seunghoon Han, Seoul (KR); Hoon Song, Yongin-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 14/833,387

(22) Filed: Aug. 24, 2015

(65) Prior Publication Data

US 2016/0055801 A1    Feb. 25, 2016

(30) Foreign Application Priority Data

Aug. 22, 2014  (KR) .................. 10-2014-0109968

(51) Int. Cl.
*G06F 3/038* (2013.01)
*G09G 3/3266* (2016.01)
*G09G 3/34* (2006.01)
*G03H 1/02* (2006.01)
(Continued)

(52) U.S. Cl.
CPC ......... *G09G 3/3266* (2013.01); *G02B 27/017* (2013.01); *G03H 1/02* (2013.01); *G03H 1/2294* (2013.01); *G09G 3/34* (2013.01); *G02B 2027/0178* (2013.01); *G03H 2001/0224* (2013.01); *G03H 2225/21* (2013.01); *G09G 2300/08* (2013.01); *G09G 2310/0264* (2013.01)

(58) Field of Classification Search
CPC combination set(s) only.
See application file for complete search history.

(56) References Cited

U.S. PATENT DOCUMENTS 5,900,966 A  *  5/1999  Kim .................. G02F 1/0316
                                              359/311
6,016,216 A  *  1/2000  Chang ................ G02F 1/116
                                              359/285
(Continued)

FOREIGN PATENT DOCUMENTS

JP    2011-510342 A    3/2011
JP    2012-125560 A    7/2012
(Continued)

*Primary Examiner* — Carolyn R Edwards
*Assistant Examiner* — Sosina Abebe
(74) *Attorney, Agent, or Firm* — Sughrue Mion, PLLC

(57) ABSTRACT

An acousto-optic element array includes: acousto-optic elements each including an acousto-optic generator, a light supply, and a wave transducer; a gate driver that selects an acousto-optic element to be driven from among the acousto-optic elements; an electrical data driver that is connected to an electrical wire and transmits electrical data to an electro-optic modulator configured to control the acousto-optic generator of the selected acousto-optic element; and a wave data driver that is connected to a waveguide and transmits wave data to the wave transducer of the selected acousto-optic element.

17 Claims, 10 Drawing Sheets

(51) Int. Cl.
 *G03H 1/22* (2006.01)
 *G02B 27/01* (2006.01)

(56) References Cited

U.S. PATENT DOCUMENTS

| | | | | |
|---|---|---|---|---|
| 2002/0191264 | A1* | 12/2002 | Vernackt | G02F 1/11 359/237 |
| 2004/0257636 | A1* | 12/2004 | Shibuya | G02F 1/11 359/305 |
| 2009/0040294 | A1* | 2/2009 | Smalley | G03H 1/02 348/40 |
| 2009/0284826 | A1* | 11/2009 | Langdon | G02F 1/116 359/308 |
| 2009/0323172 | A1* | 12/2009 | Furuya | G02F 1/3551 359/326 |
| 2011/0057932 | A1* | 3/2011 | Missbach | G09G 3/20 345/426 |
| 2012/0194885 | A1* | 8/2012 | Han | B82Y 20/00 359/10 |
| 2013/0141895 | A1 | 6/2013 | Alpaslan et al. | |
| 2013/0258451 | A1 | 10/2013 | El-Ghoroury et al. | |
| 2015/0160530 | A1 | 6/2015 | Han et al. | |

FOREIGN PATENT DOCUMENTS

| | | |
|---|---|---|
| KR | 10-2013-0022161 A | 3/2013 |
| KR | 10-2014-0022730 A | 2/2014 |
| KR | 1020150066967 A | 6/2015 |

* cited by examiner

ACOUSTO-OPTIC ELEMENT ARRAY, DISPLAY APPARATUS INCLUDING AN ACOUSTO-OPTIC ELEMENT ARRAY AND METHOD FOR DRIVING AN ACOUSTO-OPTIC ELEMENT ARRAY

CROSS-REFERENCE TO RELATED APPLICATION

This application claims priority from Korean Patent Application No. 10-2014-0109968, filed on Aug. 22, 2014 in the Korean Intellectual Property Office, the disclosure of which is incorporated herein in its entirety by reference.

BACKGROUND

1. Field

The present disclosure relates to a structure for driving an acousto-optic element array, a display apparatus using the acousto-optic element array, and a method for driving the acousto-optic element array.

2. Description of the Related Art

An acousto-optic effect is an effect in which an optical characteristic of a medium is transformed by a sound wave or an ultrasonic wave. A light beam, which is incident on a medium having a transformed optical characteristic, is differently modulated and emitted according to the degree of transformation. For example, a refractive index of the medium may be periodically changed by the acousto-optic effect. Such a medium may operate as a phase grating to diffract incident light. At this time, the intensity or the diffraction angle of the diffracted light may be changed by adjusting the intensity or frequency of the sound wave or the ultrasonic wave applied to the medium. Therefore, it is possible to implement an optical modulator that modulates an amplitude of a light beam by using an acousto-optic effect, or a scanner that deflects a light beam.

Extensive research has been conducted to develop display technologies using an optical modulator that modulates an amplitude of a light beam by using an acousto-optic effect, or a scanner that deflects a light beam.

A three-dimensional (3D) image display apparatus, which has been currently commercialized, uses binocular parallax between two eyes of a viewer. The 3D image display apparatus provides a left eye and a right eye of the viewer with a left-eye image and a right-eye image having different viewpoints, allowing the viewer to experience a three-dimensional effect. Such a 3D image display apparatus may be classified as a glass type 3D image display apparatus, which requires special glasses, and a non-glass type 3D image display apparatus, which requires no glasses.

Research has been conducted to develop a holographic 3D image display apparatus that displays a more natural 3D image. A light beam may be considered as a wave with intensity information and phase information. Holographic technology may display an image by controlling the phase of light and the intensity of light.

Research also has been conducted to develop a structure for driving an acousto-optic element array used in an ultra high definition television (UHDTV), a super high vision (SHV) television, and in the generation of a hologram.

SUMMARY

One or more exemplary embodiments provide structures for driving an acousto-optic element array including a gate driver, an electrical data driver, and a wave data driver.

According to an aspect of an exemplary embodiment, there is provided an acousto-optic element array including an acousto-optic element including an acousto-optic generator, a light supply, and a wave transducer; an electro-optic modulator configured to control the acousto-optic generator; a gate driver configured to select and drive the acousto-optic element; an electrical data driver configured to transmit electrical data to the electro-optic modulator through an electrical wire connected to the electrical data driver; and a wave data driver configured to transmit wave data to the wave transducer through a waveguide connected to the wave data driver.

The light supply may be configured to input a light beam to the acousto-optic generator in a first direction, and the wave transducer may include a first wave transducer configured to apply a first acoustic wave to the acousto-optic generator in a second direction; and a second wave transducer configured to apply a second acoustic wave to the acousto-optic generator in a third direction.

The wave data driver may include a first wave data driver configured to transmit wave data generated by a first wave generator to the first wave transducer through a first waveguide connected to the first wave data driver; and a second wave data driver configured to transmit wave data generated by a second wave generator to the second wave transducer through a second waveguide connected to the second wave data driver.

The electrical data driver may be configured to transmit the electrical data to the electro-optic modulator through a transistor switch connected to the electrical wire.

The wave data driver may be configured to transmit the wave data to the wave transducer through a transistor switch connected to the waveguide.

The acousto-optic element array may further include a plurality of acousto-optic elements including the acousto-optic element, wherein the wave data driver includes: a first wave data driver configured to transmit first wave data to a first wave transducer of a first acousto-optic element among the plurality of acousto-optic elements for a first time period, and transmit second wave data to a second wave transducer of a second acousto-optic element among the plurality of acousto-optic elements for a second time period, the second acousto-optic element being adjacent to the first acousto-optic element; and a second wave data driver configured to transmit third wave data to a second wave transducer of the first acousto-optic element for the first time period, and transmit fourth wave data to a first wave transducer of a third acousto-optic element among the plurality of acousto-optic elements, for the second time period, the third acousto-optic elements being adjacent to the first acousto-optic element.

The first wave data driver may be connected to a first wave guide and further configure to transmit the first wave data to the first wave transducer through the first waveguide, and the second wave data driver may be connected to a second waveguide and further configured to transmit the second wave data to the second wave transducer through the second waveguide.

The gate driver may be further configured to drive the first acousto-optic element for the first time period and drive the second acousto-optic element and the third acousto-optic element for the second time period.

The light supply may include an on/off light source, and the gate driver may be further configured to control whether to turn on or off the light supply.

The electrical data driver may be further configured to transmit the electrical data to the electro-optic modulator through a transistor switch connected to the electrical wire.

The wave data driver may be configured to transmit the wave data to the wave transducer through a transistor switch connected to the waveguide.

The acousto-optic element array may further include a plurality of acousto-optic elements, including the acousto-optic element, wherein the gate driver is further configured to sequentially activate and drive at least one of the plurality of acousto-optic elements, at each of scan lines of the acousto-optic element array.

According to an aspect of another exemplary embodiment, there is provided a display apparatus including: a display panel with the acousto-optic element array including an acousto-optic element including an acousto-optic generator, a light supply, and a wave transducer; an electro-optic modulator configured to control the acousto-optic generator; a gate driver configured to select and drive the acousto-optic element; an electrical data driver configured to transmit electrical data to the electro-optic modulator through an electrical wire connected to the electrical data driver; and a wave data driver configured to transmit wave data to the wave transducer through a waveguide connected to the wave data driver, wherein the display apparatus is configured to display an image by adjusting at least one selected from a group consisting of an exit direction, a phase, and intensity of a light beam emitted frontward from a plurality of acousto-optic generators, including the acousto-optic generator, which are arranged two-dimensionally in the display panel.

The display apparatus may be further configured to display a two-dimensional (2D) image in a manner such that a single field of vision is formed by adjusting the exit direction of the light beam emitted from the display panel.

The display apparatus may be further configured to display a three-dimensional (3D) image in a manner such that at least two fields of vision are formed by adjusting the exit direction of the light beam emitted from the display panel.

The display apparatus may be further configured to switch between displaying a 2D image and a 3D image by selectively adjusting the exit direction of the light beam emitted from the display panel.

The display apparatus may be further configured to display a multi-view 3D image in a manner such that at least two fields of vision are formed on each of a top side, a bottom side, a left side, and a right side of the display apparatus, by adjusting the exit direction of the light beam emitted from the display panel.

The display apparatus may be a holographic display apparatus that displays a hologram image by modulating the exit direction and the phase of the light beam emitted from the display panel.

According to an aspect of another exemplary embodiment, there is provided a method of driving an acousto-optic element array, the method including: selecting an acousto-optic element to be driven from among acousto-optic elements each including an acousto-optic generator, a light supply, and a wave transducer; transmitting electrical data to an electro-optic modulator that controls the acousto-optic generator of the selected acousto-optic element; transmitting wave data to the wave transducer of the selected acousto-optic element through a waveguide; and emitting a light beam to the selected acousto-optic element, which is input from the light supply to the acousto-optic generator, in a frontward direction of the acousto-optic generator by modulating the light beam by using an acoustic wave applied to the acousto-optic generator from the wave transducer.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
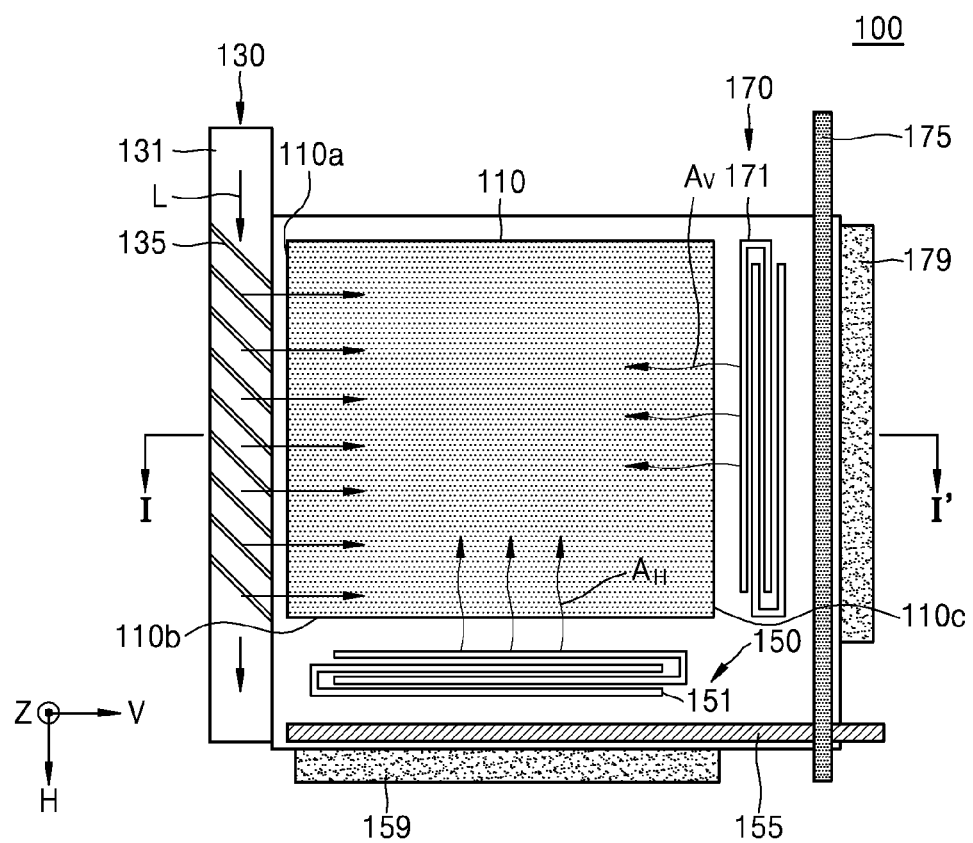
FIG. 1 is a schematic plan view of an acousto-optic element, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that, although the terms "first", "second", etc. may be used herein to describe various elements, these elements should not be limited by these terms. These terms are only used to distinguish one element from another.

The terminology used herein is for the purpose of describing particular embodiments only and is not intended to be limiting of the embodiments. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

Throughout the specification, it will be understood that when an element is referred to as being "connected with" another element, it can be directly connected with the other element, or electrically connected with the other element while intervening elements may also be present. It will also be understood that the terms "comprises", "includes", and "has", when used herein, specify the presence of stated elements, but do not preclude the presence or addition of other elements, unless otherwise defined.

In the present specification, the term "acousto-optic element" refers to an element that is used to modulate an amplitude, a frequency, a phase, a polarization, or a spatial position of a light beam by applying a wave to the light beam and then emits the modulated light beam. The term "wave" may include a sound wave, an ultrasonic wave, a radio frequency (RF) wave, or the like, but is not limited thereto.

FIG. 1 is a schematic plan view of an acousto-optic element, according to an exemplary embodiment.

FIG. 1 illustrates an acousto-optic element 100 included in an acoustic-optic element array. The acousto-optic element 100 may include an acousto-optic generator 110 provided on a substrate 117, a light supply 130 that supplies a light beam to the acousto-optic generator 110, a first wave transducer 150 that applies a first acoustic wave AH to the acousto-optic generator 110, and a second wave transducer 170 that applies a second acoustic wave AV to the acousto-optic generator 110.

The acousto-optic generator 110 may include a core layer, and a first clad layer and a second clad layer disposed on a lower surface and an upper surface of the core layer, respectively. A refractive index of the core layer may be higher than a refractive index of the first and second clad layers. Either or both of the first and second clad layers may be air or may be in a vacuum state. In this case, it may be considered that either or both of the first and second clad layers are omitted.

A reflection layer may be further provided below the first clad layer. The reflection layer may be made of a metal, such as silver (Ag), which has a good reflectivity. As described below, when a light beam incident on the acousto-optic generator 110 is modulated and emitted from the acousto-optic generator 110, the reflection layer may reflect the light beam directed downward, such that the light beam is emitted upward.

At least one selected from the group consisting of the core layer, the first clad layer, and the second clad layer may be made of an acousto-optic material having an acousto-optic effect. In a case where at least one selected from the group consisting of the core layer, the first clad layer, and the second clad layer is made of the acousto-optic material, when a sound wave is applied to the acousto-optic generator 110, a local density of the acousto-optic generator 110 also may be repeatedly changed according to a compression and a rarefaction of the sound wave. Examples of the acousto-optic material may include ZnO, LiNbO$_3$, TiO$_2$, Si, and SrTiO$_3$.

The acousto-optic generator 110 may include at least three sides, a first side 110a, a second side 110b, and a third side 110c. For example, as illustrated in FIG. 1, the acousto-optic generator 110 may have a shape with four sides (that is, a rectangular shape when viewed from above).

A light supply 130, which supplies a light beam L in a first direction, may be provided on the first side 110a of the acousto-optic generator 110. The light supply 130 may include an optical waveguide 131 and an optical coupler 135.

The optical waveguide 131 may extend along the first side 110a of the acousto-optic generator 110 and may transfer the light beam L. The optical coupler 135 may be provided between the optical waveguide 131 and the acousto-optic generator 110 and may couple the light beam transferred through the optical waveguide 131 to the core layer of the acousto-optic generator 110. For example, on the first side 110a of the acousto-optic generator 110, the second clad layer may be stepped to expose a portion of the core layer as illustrated in FIG. 1. The optical waveguide 131 may be disposed between the stepped side of the second clad layer and the exposed upper surface of the core layer and may be disposed in contact with the upper surface of the core layer of the acousto-optic generator 110. The optical coupler 135 may be disposed between the optical waveguide 131 and the core layer and may couple the light beam transferred from the optical waveguide 131 to the core layer. As illustrated in FIG. 1, the optical coupler 135 may be a grating coupler having a grating pattern. For example, the grating pattern of the optical coupler 135 may be formed in a groove shape on either of the optical waveguide 131 and the core layer, or may be formed by patterning using materials with different refractive indexes. In FIG. 1, the incident direction of the light beam L is illustrated as a +V axis direction, but is not limited thereto. The first direction may be an oblique direction from the light supply 130 to the first side 110a of the acousto-optic generator 110, depending on a coupling method of the optical coupler 135.

The first wave transducer 150 may include a first sound wave generator 151, which is disposed on the second side 110b of the acousto-optic generator 110 to generate the first acoustic wave AH in a second direction, and a first RF waveguide 155, which applies a first RF power to the first sound wave generator 151. Similarly, the second wave transducer 170 may include a second sound wave generator 171, which is disposed on the third side 110c of the acousto-optic generator 110 to generate the second acoustic wave AV in a third direction, and a second RF waveguide 175, which applies a second RF power to the second sound wave generator 171. The second direction and the third direction are different from the first direction in which the above-described light beam L is incident. For example, as illustrated in FIG. 1, the second direction may be a −H axis direction and the third direction may be a +V axis direction. Although not illustrated, ground lines or common lines for the first and second sound wave generators 151 and 171 may be additionally provided in the first and second wave transducers 150 and 170.

For example, the first and second sound wave generators 151 and 171 may be electro-acoustic modulators configured to generate a surface acoustic wave (SAW) or a bulk acoustic wave (BAW). The first and second sound wave generators 151 and 171 may be provided in one or different layers selected from the group consisting of the core layer, the first clad layer, the second clad layer, the reflection layer, and the substrate 117, or may be provided in an interface between the layers. In addition, as described below, the first and second RF waveguides 155 and 175 are alternately arranged in an array structure of the acousto-optic element 100. In this respect, the first and second RF waveguides 155 and 175 may be different layers.

On the other hand, a first sound absorption member 159 may be provided outside the first sound wave generator 151, and a second sound absorption member 179 may be provided outside the second sound wave generator 171. The first and second sound absorption members 159 and 179 may prevent outward dispersion of the first and second acoustic waves AH and AV generated by the first and second sound wave generators 151 and 171. When the acousto-optic element 100 according to the present embodiment is used in an array form as described below, interference between the adjacent acousto-optic elements 100 may be prevented.

The array of the acousto-optic elements 100 disclosed in the present specification is merely exemplary. Driving structures and driving methods according to embodiments may also be applied to a spatial modulation array that controls an electromagnetic wave as well as a light beam.

The following description will be given on a structure for driving an acousto-optic element array in a case where the acousto-optic element 100 is used in an array form.

Figure 2:
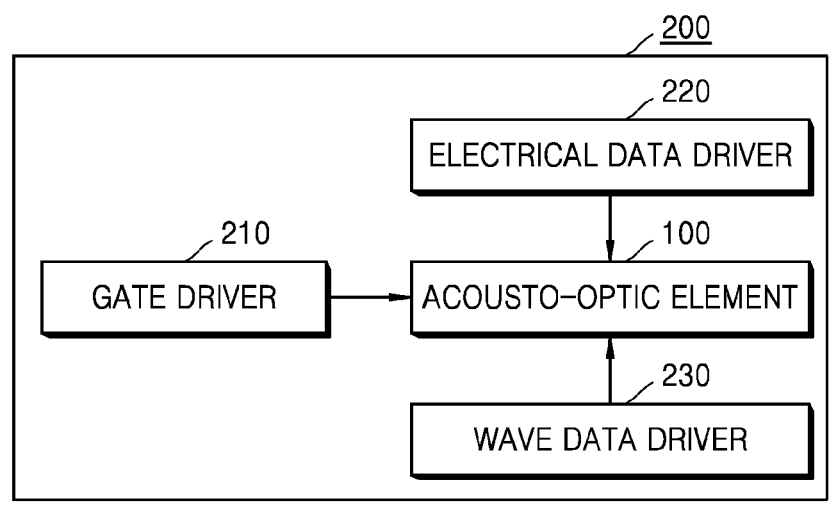
FIG. 2 is a block diagram for describing a structure for driving an acousto-optic element array, according to an exemplary embodiment.

FIG. 2 is a block diagram for describing a structure for driving an acousto-optic element array, according to an exemplary embodiment.

As illustrated in FIG. 2, an acousto-optic element array 200 according to an exemplary embodiment may include an acousto-optic element 100, a gate driver 210, an electrical data driver 220, and a wave data driver 230. The acousto-optic element array 200 may be implemented by more elements than those illustrated.

The acousto-optic element 100 may include an acousto-optic generator 110, a light supply 130, and wave transducers 150 and 170.

The acousto-optic element 100 may emit a light beam, which is input from the light supply 130 to the acousto-optic generator 110, in a frontward direction of the acousto-optic generator 110 by modulating the light beam by using an acoustic wave applied to the acousto-optic generator 110 from the wave transducers 150 and 170.

Since the acousto-optic element 100 illustrated in FIG. 2 is substantially the same as the acousto-optic element 100 illustrated in FIG. 1, a redundant description thereof will be omitted.

The acousto-optic generator 110 according to the embodiment may include, for example, an acousto-optic modulator, a meta-optic modulator, or the like, but is not limited thereto.

The gate driver 210 may select at least one of the acousto-optic elements 100 included in the acousto-optic element array 200.

The electrical data driver 220 may sequentially activate scan lines of the acousto-optic element array 200 and drive the acousto-optic elements 100 included in the activated scan line.

The electrical data driver 220 may be connected to an electro-optic modulator through an electrical wire and transmit electrical data to the electro-optic modulator that controls the acousto-optic generator 110 of the selected acousto-optic elements 100.

According to an exemplary embodiment, the electro-optic modulator (not illustrated) may be connected to the electrical data driver 220 and the acousto-optic generator 110 and control the light beam emitted from the acousto-optic generator 130 by using the electrical data transmitted from the electrical data driver 220. For example, the electro-optic modulator may adjust the amplitude of the light beam emitted from the acousto-optic generator 110.

According to an exemplary embodiment, the electrical data driver 220 may be connected to the electro-optic modulator through an electrical wire and a transistor switch and control whether to drive the electro-optic modulator.

The wave data driver 230 may be connected to the waveguide and transmit wave data to the wave transducers 150 and 170 of an acousto-optic element selected from the acousto-optic elements 100.

According to an exemplary embodiment, the wave transducers 150 and 170 may receive wave data generated by a wave generator from the wave data driver 230 through the waveguide and apply an acoustic wave to the acousto-optic generator 110.

Examples of the wave data may include sound wave data, ultrasonic wave data, and radio frequency (RF) data, but is not limited thereto.

According to an exemplary embodiment, the wave data driver 230 may be connected to the wave transducers 150 and 170 through a waveguide and a transistor switch and control whether to drive the wave transducers 150 and 170.

Figure 3:
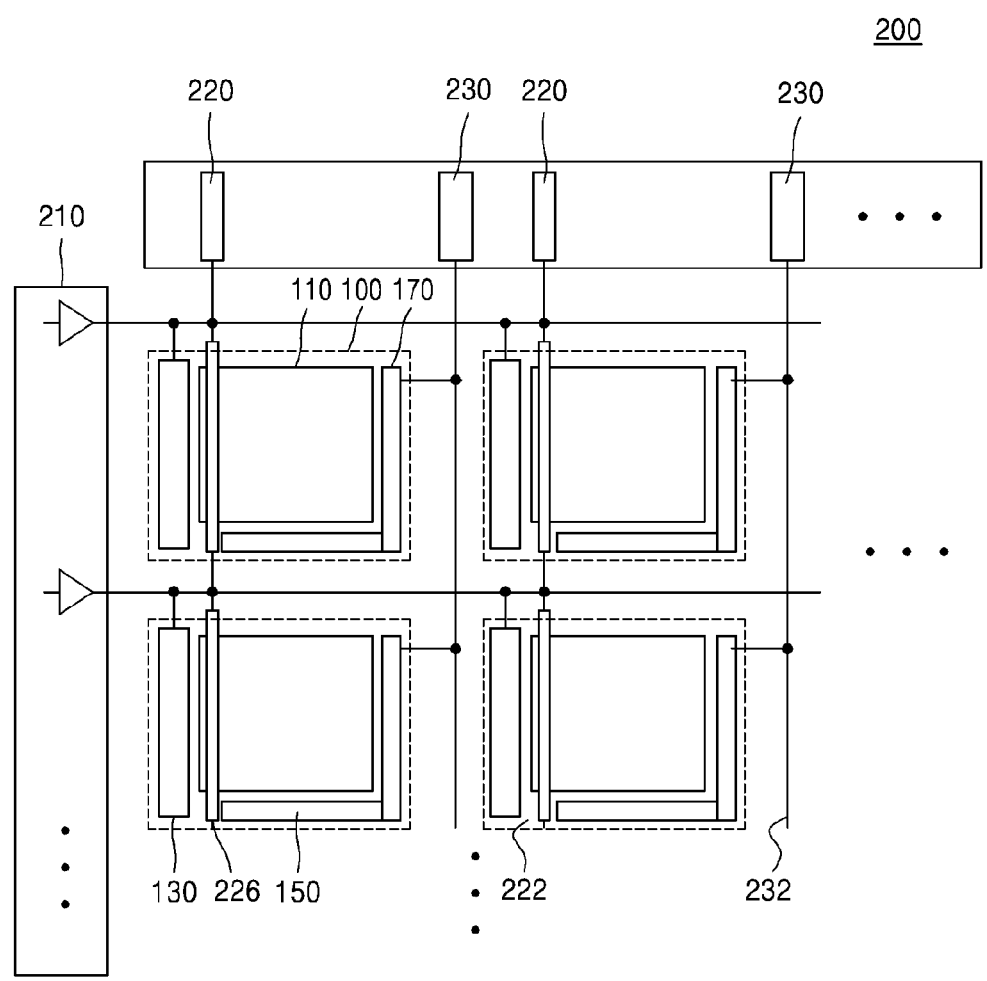
FIG. 3 is an exemplary diagram for describing a structure for driving an acousto-optic element array, according to an exemplary embodiment.

FIG. 3 is an exemplary diagram for describing a structure for driving an acousto-optic element array, according to an exemplary embodiment.

As shown in FIG. 3, a gate driver 210 according to an exemplary embodiment may be connected to an electro-optic modulator 226 of an acousto-optic element 100 through a transistor switch at each row of the acousto-optic element array 200. The gate driver 210 may be connected to first and second wave transducers 150 and 170 of the acousto-optic element 100 through a transistor switch at each row of the acousto-optic element array 200. In addition, the gate driver 210 may be connected to a light supply 130 of the acousto-optic element 100 at each row of the acousto-optic element array 200. According to an exemplary embodiment, an electrical data driver 220 may be connected to an electro-optic modulator of the acousto-optic element 100 through an electrical wire 222 at each column of the acousto-optic element array 200. In addition, a wave data driver 230 may be connected to the first and second wave transducers 150 and 170 of the acousto-optic element 100 through a waveguide 232 at each column of the acousto-optic element array 200. The first waver transducer 150 and the second waver transducer 170 may be separately formed and disposed to abut each other in each acousto-optic element 100. Alternatively, the first waver transducer 150 and the second waver transducer 170 may be integrally formed as a single component. In either case, the wave data driver 230 may control the first and the second transducer 150 and 170 together with a same signal.

According to another exemplary embodiment, the gate driver 210 may be connected to an electro-optic modulator 226 of the acousto-optic element 100 through a transistor switch at each column of the acousto-optic element array 200. The gate driver 210 may be connected to the first and second wave transducers 150 and 170 of the acousto-optic element 100 through a transistor switch at each column of the acousto-optic element array 200. In addition, the gate driver 210 may be connected to the light supply 130 of the acousto-optic element 100 at each column of the acousto-optic element array 200. According to an exemplary embodiment, the electrical data driver 220 may be connected to the electro-optic modulator of the acousto-optic element 100 through the electrical wire 222 at each row of the acousto-optic element array 200. In addition, the wave data driver 230 may be connected to the first and second wave transducers 150 and 170 of the acousto-optic element 100 through the waveguide 232 at each row of the acousto-optic element array 200.

According to an exemplary embodiment, the light supply 130 may make a light beam incident on the acousto-optic generator 110 in a first direction.

According to an exemplary embodiment, the first and second wave transducers 150 and 170 may be a single wave transducer that applies an acoustic wave to the acousto-optic generator 110 in second and third directions.

According to another exemplary embodiment, the first wave transducer 150 may apply an acoustic wave to the acousto-optic generator 110 in the second direction, and the second wave transducer 170 may apply the same acoustic wave to the acousto-optic generator 110 in the third direction.

According to another exemplary embodiment, the first wave transducer 150 may apply a first acoustic wave to the acousto-optic generator 110 in the second direction, and the second wave transducer may apply a second acoustic wave to the acousto-optic generator 110 in the third direction. In this case, the first wave transducer 150 and the second wave transducer 170 may receive different wave data and modulate the wave data by controlling interference and diffraction of the light beam more precisely. Therefore, in a case where the first and second wave transducers 150 and 170 apply different acoustic waves in different directions, a more sophisticated display may be achieved.

The wave data driver 230 may include a first wave data driver that is connected to a first waveguide to transmit wave data, which is generated by the first wave generator, to the first wave transducer of the selected acousto-optic element, and a second wave data driver that is connected to a second waveguide to transmit wave data, which is generated by the second wave generator, to the second wave transducer of the selected acousto-optic element.

Figure 4:
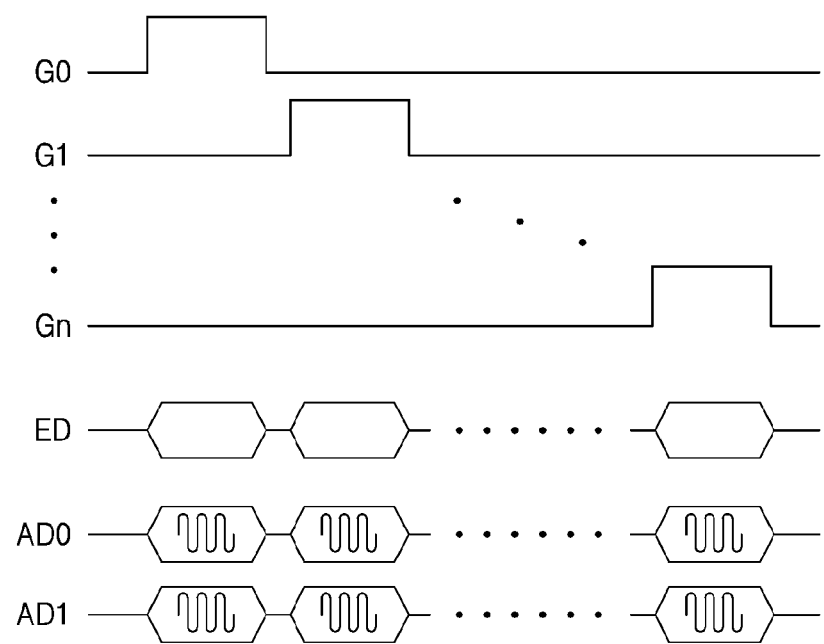
FIG. 4 is a timing diagram for describing a driving of an acousto-optic element array, according to an exemplary embodiment.

FIG. 4 is a timing diagram for describing the driving of the acousto-optic element array, according to an exemplary embodiment.

According to an exemplary embodiment, the gate driver 210 may sequentially activate and drive the acousto-optic elements 100 at each of the scan lines of the acousto-optic element array 200.

As shown in FIG. 4, the acousto-optic element array 200 includes n scan lines (for example, rows). The gate driver 210 may sequentially activate gate drivers G0, G1, G2, . . . , and Gn that are connected to the n scan lines of the acousto-optic element array 200, respectively.

The acousto-optic element 100, which is included in the scan line activated by the gate driver G0, is driven using the electrical data transmitted from the electrical data driver 220 and the wave data transmitted from the wave data driver 230 during the activation of the gate driver G0.

The acousto-optic element 100, which is included in the scan line activated by the gate driver G1, is driven using the electrical data transmitted from the electrical data driver 220 and the wave data transmitted from the wave data driver 230 during the activation of the gate driver G1.

Similarly, the acousto-optic element 100, which is included in the scan line activated by the gate driver Gn, is driven using the electrical data transmitted from the electrical data driver 220 and the wave data transmitted from the wave data driver 230 during the activation of the gate driver Gn.

According to an exemplary embodiment, the display panel is driven by the sequential activation of the acousto-optic element array 200 at each of the scan lines.

Figure 5:
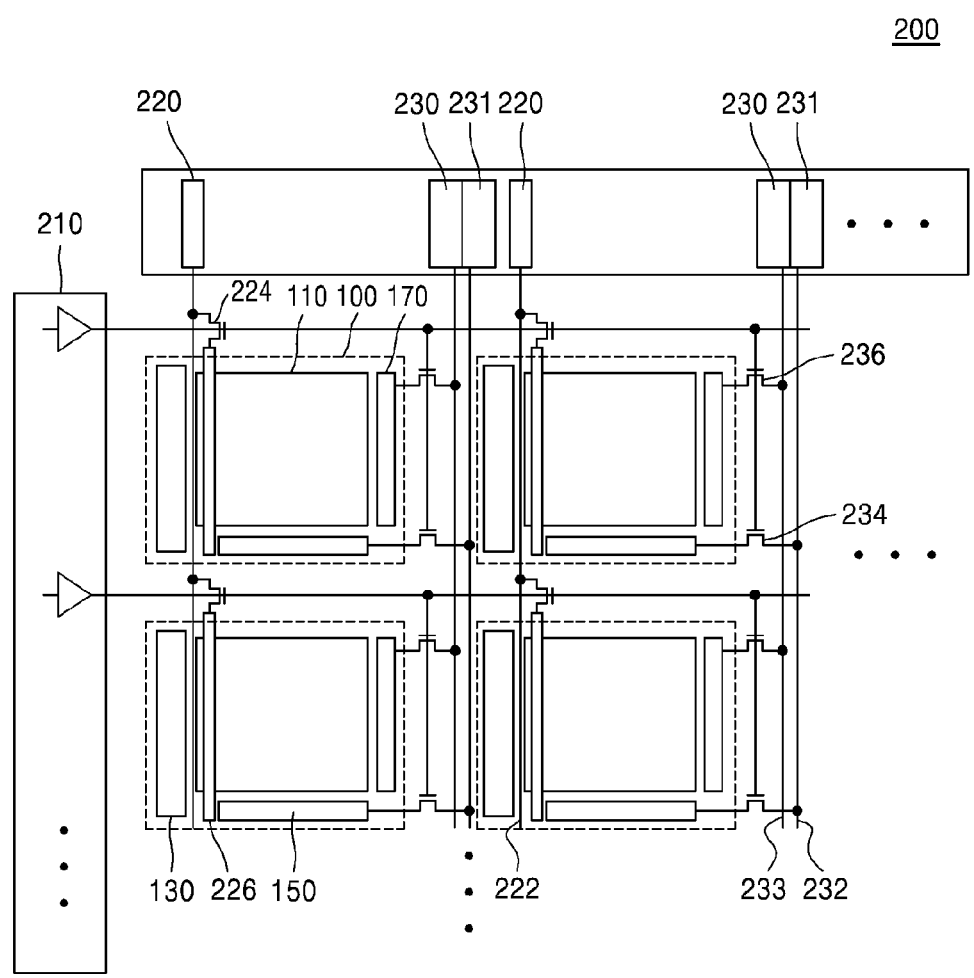
FIG. 5 is an exemplary diagram for describing a structure for driving an acousto-optic element array, according to another embodiment.

FIG. 5 is an exemplary diagram for describing a structure for driving an acousto-optic element array using a plurality of transistor switches 224, 234, and 236, and first and second wave data driver 230 and 231, according to another exemplary embodiment.

As shown in FIG. 5, the acousto-optic element array 200 may implement an image on a wave display by inputting electrical data and wave data to each column by using the transistor switches 224, 234, and 236. The transistor switches 224, 234, and 236 may respectively control an input signal from the electrical data driver 220 to the electro-optic modulator 226, an input signal from the second wave data driver 231 to the first wave transducer 150, and an input signal from the first wave data driver 230 to the second wave transducer 170.

The electrical data driver 220 may transmit electrical data to the electro-optic modulator 226 through the transistor switch 234 connected to the electrical wire 222. In addition, the wave data driver 230 may transmit wave data to the first and second wave transducers 150 and 170 through the transistor switch connected to the waveguide 232.

The larges-sized acousto-optic element array 200 may be driven using the transistor switches 224, 234, and 236.

Figure 6:
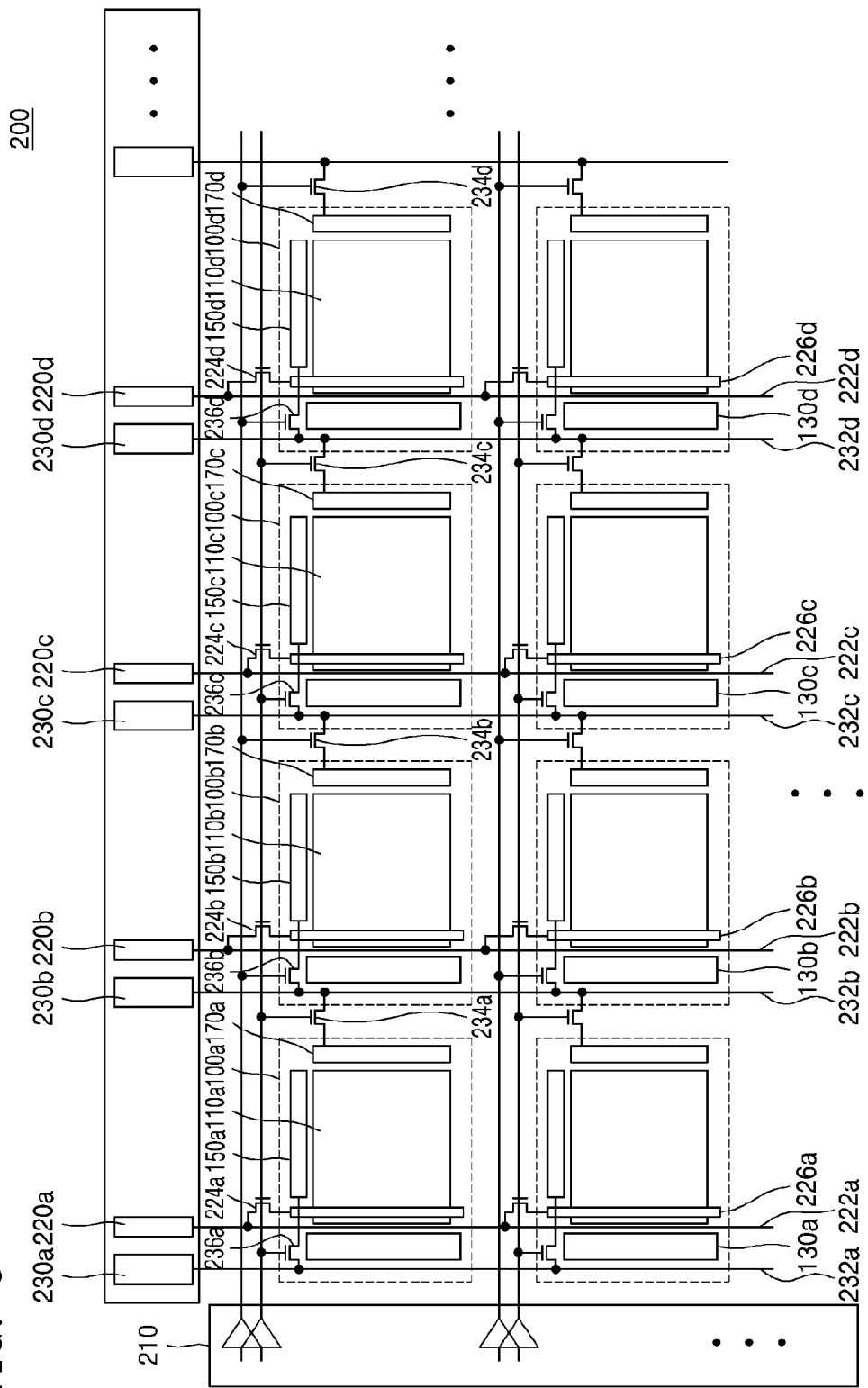
FIG. 6 is an exemplary diagram for describing a structure for driving an acousto-optic element array, according to another embodiment.

FIG. 6 is an exemplary diagram for describing a structure for driving an acousto-optic element array, according to another exemplary embodiment.

First and second wave transducers 150 and 170 may apply a first acoustic wave to an acousto-optic generator 110 in a second direction, and apply a second wave transducer that applies a second acoustic wave to the acousto-optic generator 110 in a third direction, respectively. The exemplary embodiment relates to a structure in which a first wave transducer of an acousto-optic element and a second wave transducer of an acousto-optic element share a single waveguide.

According to an exemplary embodiment, two adjacent acousto-optic elements of an acousto-optic element array 200 may share a waveguide (e.g., a first waveguide 232*b*) and a wave data driver (e.g., first wave data driver 230*b*) disposed between the two adjacent acousto-optic elements. The two adjacent acousto-optic elements may be driven to alternately receive wave data from the single wave data driver.

For example, a first wave data driver 230*b* may be connected to a first waveguide 232*b* and transmit first wave data, which is generated by a first wave generator, to a first wave transducer 150*b* of a first acousto-optic element 100*b* for a first time period. The first wave data driver 230*b* may transmit second wave data, which is generated by the first wave generator, to a second wave transducer 170*a* of a second acousto-optic element 100*a* adjacent to the first acousto-optic element 100*b* for a second time period. A second wave data driver 230*c* may be connected to a second waveguide 232*c* and transmit third wave data, which is generated by a second wave generator, to the second wave transducer 170*b* of the first acousto-optic element 100*b* for the first time period. The second wave data driver 230*c* may transmit fourth wave data, which is generated by the second wave generator, to a first wave transducer 150*c* of a third acousto-optic element 100*c* adjacent to the first acousto-optic element 100*b* for the second time period.

According to an exemplary embodiment, the gate driver 210 may drive the first acousto-optic element 100*b* and the fourth acousto-optic element 100*d* for the first time period. In addition, the gate driver 210 may drive the second acousto-optic element 100*a* and the third acousto-optic element 100*c* for the second time period.

The structure in which two acousto-optic elements share one of the waveguides and one of the wave data drivers may reduce components required for the acousto-optic element array 200. Therefore, it is possible to reduce costs for configuring the acousto-optic element array 200.

Figure 7:
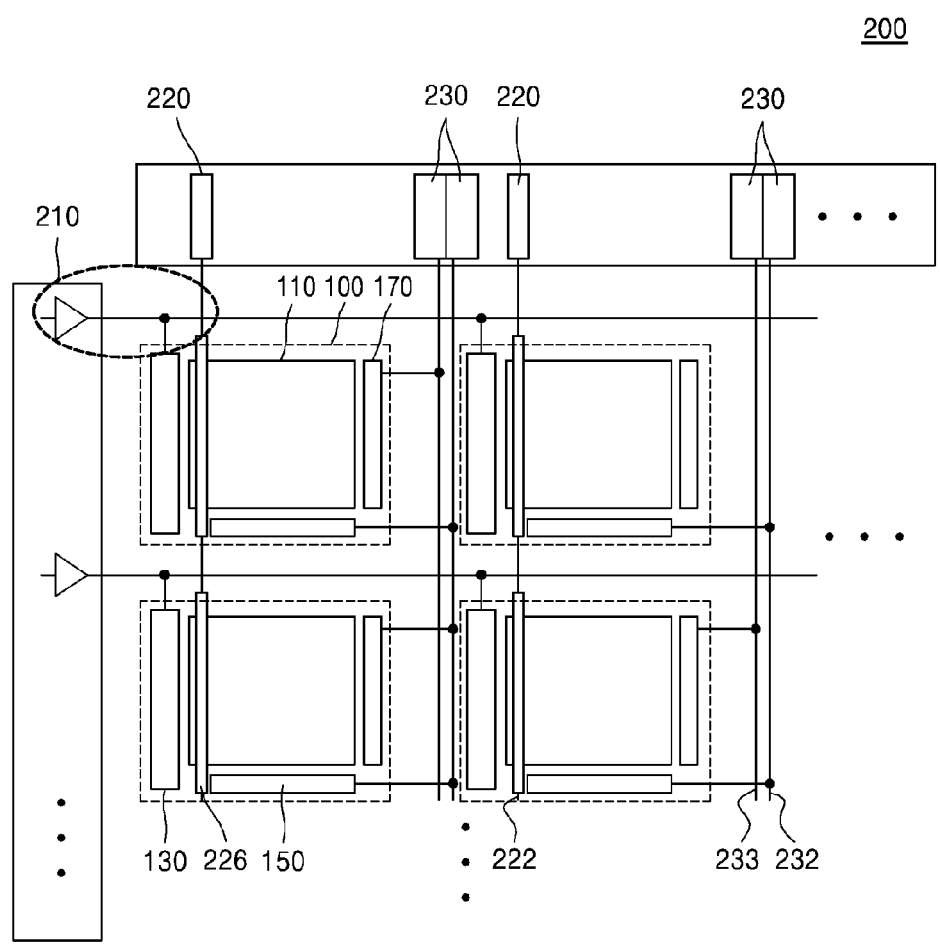
FIG. 7 is an exemplary diagram for describing a structure for driving an acousto-optic element array, in which a gate driver controls whether to turn on or off a light source, according to an embodiment.

FIG. 7 is an exemplary diagram for describing a structure for driving an acousto-optic element array, in which a gate driver controls whether to turn on or off a light source, according to an exemplary embodiment.

As shown in FIG. 7, in an acousto-optic element array 200, a wave data driver 230 may be directly connected to wave transducers 150 and 170 through waveguides 233 and 232, without using transistor switches, and an electrical data driver 220 may be directly connected to an electro-optic modulator through an electrical wire 222, without using transistor switches. In addition, a gate driver 210 may be directly connected to a light supply 130 through an electrical wire.

In the acousto-optic element array 200, the turn-on or turn-off of the light supply 130 may be controlled by a gate driver 210 connected to a light supply 130 of a selected acousto-optic element, without using switches. At this time, the light supply 130 may include an on/off light source capable of being turned on or off.

The on/off light source refers to a light source that is capable of being turned on or off for each acousto-optic element so that the gate driver 210 can control the light supply 130. For example, the on/off light source includes an organic light-emitting diode (OLED) or a light-emitting diode (LED) as a self-luminous device, but is not limited thereto. The gate driver 210 may control the light emission or non-emission of the acousto-optic element 100 by controlling the turn-on or turn-off of the light supply 130, without controlling the transmission of the wave data or the electrical data.

Since the transistor switches are eliminated from the acousto-optic element array 200, it is possible to remove an error or loss caused by the transistor switches. In addition, since the transistor switches are eliminated from the acousto-optic element array 200, it is possible to reduce an area and a volume necessary for the acousto-optic element array 200. Furthermore, since the gate driver 210 controls whether to turn on or off the light source, it is possible to reduce power consumption.

Figure 8:
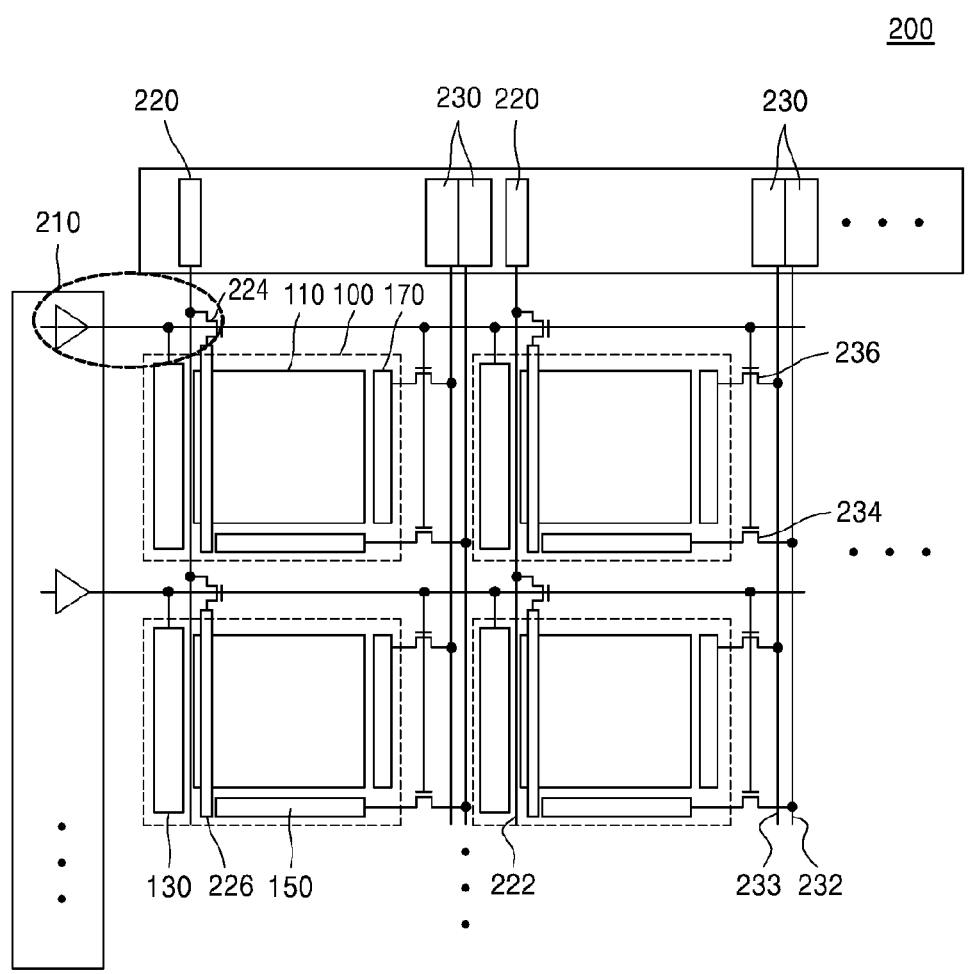
FIG. 8 is an exemplary diagram for describing a structure for driving an acousto-optic element array, in which a gate driver controls whether to turn on or off a light source, according to another embodiment.

FIG. 8 is an exemplary diagram for describing a structure for driving an acousto-optic element array, in which a gate driver controls whether to turn on or off a light source, according to another exemplary embodiment.

As shown in FIG. 8, an acousto-optic element array 200 may include transistor switches 224, 234, and 236, and a gate driver 210 may be directly connected to a light supply 130 through an electrical wire. A wave data driver 230 may control wave transducers 150 and 170 through the transistor switches 234 and 236, and an electrical data driver 220 may control an electro-optic modulator 226 through the transistor switch 224. In addition, the gate driver 210 may be directly connected to the light supply 130 through an electrical wire 222. The gate driver 210 may control whether to turn on or off the light supply 130.

According to an exemplary embodiment, the light supply 130 may include an on/off light source. Since the on/off light source has been described with reference to FIG. 7, a redundant description thereof will be omitted. The gate driver 210 may be connected to the light supply 130 of the selected acousto-optic element and control whether to turn on or off the light source. The electrical data driver 220 may transmit electrical data to the electro-optic modulator 226 through the transistor switch 224 connected to the electrical wire 222. The wave data driver 230 may transmit wave data to the wave transducers 150 and 170 through the transistor switches 234 and 236 connected to the waveguide 232.

According to an exemplary embodiment, the acousto-optic element array 200 includes the transistor switches 224, 234, and 236 and the gate driver 210 controls the driving of the acousto-optic element array 200. Therefore, it is possible to achieve the loading reduction in the gate driver 210 and power reduction according to the control of the turn-on or turn-off of the light source.

Figure 9:
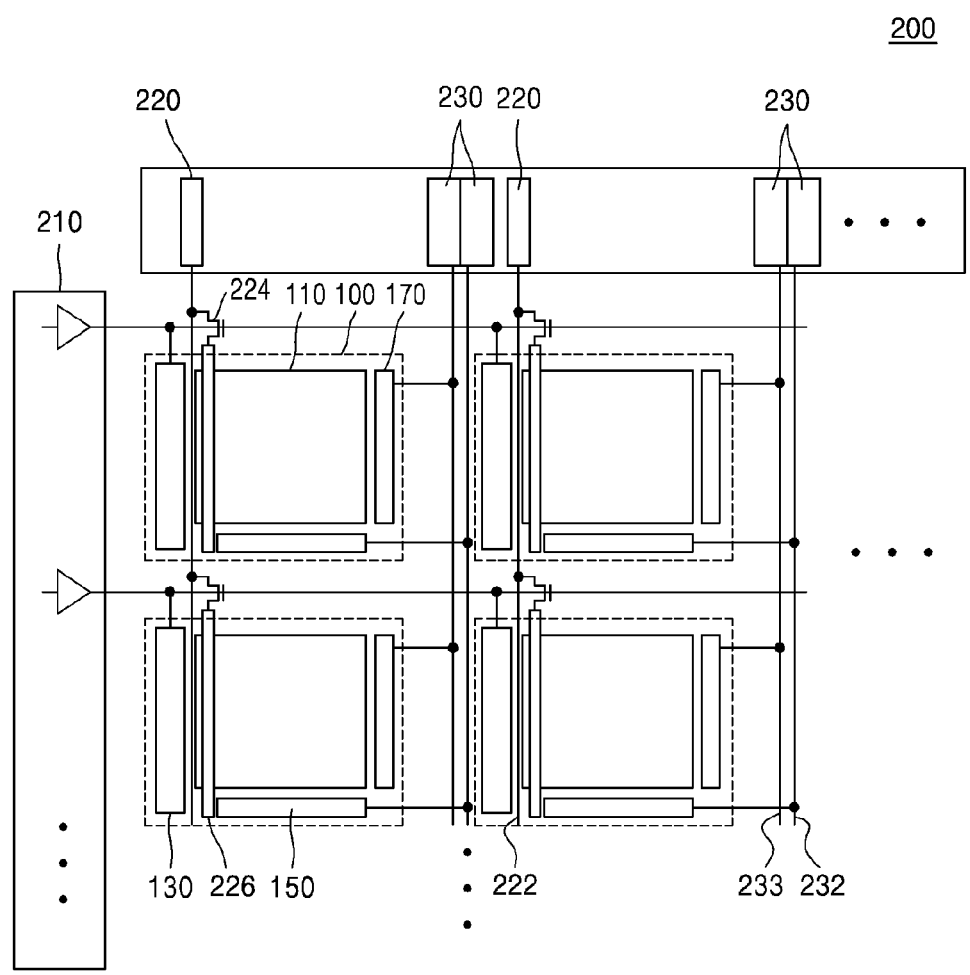
FIG. 9 is an exemplary diagram for describing a structure for driving an acousto-optic element array, in which a gate driver controls whether to turn on or off a light source, according to another embodiment.

FIG. 9 is an exemplary diagram for describing a structure for driving an acousto-optic element array, in which a gate driver controls whether to turn on or off a light source, according to another exemplary embodiment.

As shown in FIG. 9, in an acousto-optic element array 200, a wave data driver 230 may be directly connected to wave transducers 150 and 170 through waveguides 233 and 232, without using transistor switches. An electrical data driver 220 may control an electro-optic modulator 226 through the transistor switch 224. In addition, the gate driver 210 may be directly connected to a light supply 130 through the electrical wire 222. The gate driver 210 may control whether to turn on or off the light supply 130.

According to an exemplary embodiment, the light supply 130 may include an on/off light source. Since the on/off light source has been described with reference to FIG. 7, a redundant description thereof will be omitted. The gate driver 210 may be connected to the light supply 130 of the selected acousto-optic element and control whether to turn on or off the light source. The electrical data driver 220 may transmit electrical data to the electro-optic modulator 226 through the transistor switch 224 connected to the electrical wire 222. At this time, the electrical wire connected to the transistor switch 224 and the electrical wire connecting the gate driver 210 and the light source unit 130 may be shared.

According to an exemplary embodiment, the acousto-optic element array 200 includes the transistor switch 224. Therefore, it is possible to achieve the loading reduction in the gate driver 210 and power reduction according to the control of the turn-on or turn-off of the light source. In addition, since the gate driver 210 controls the driving of the acousto-optic element array 200, it is possible to achieve power reduction according to the control of the turn-on or turn-off of the light source. In addition, since the transistor switches 234 and 236 connected to the wave data driver 230 are eliminated, it is possible to reduce the number of transistor switches in the acousto-optic element array 200. Therefore, it is possible to reduce an error or loss caused by the transistor switches and reduce an area and a volume necessary for the acousto-optic element array 200.

Figure 10:
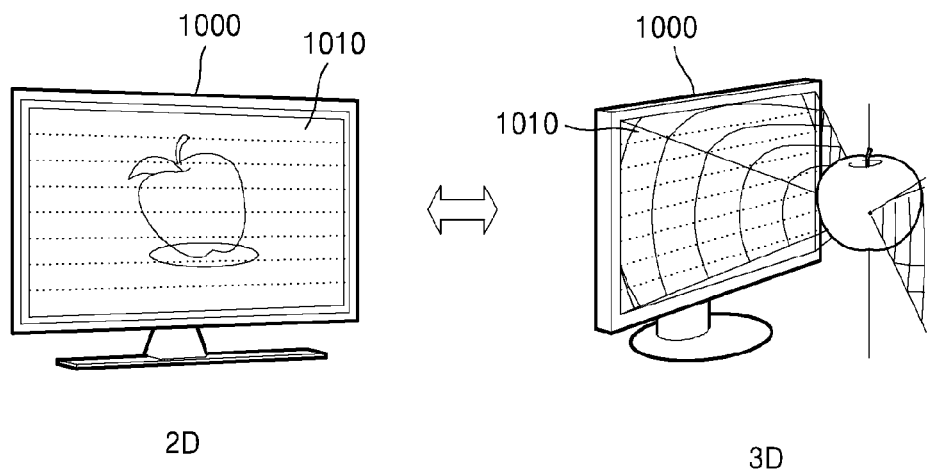
FIG. 10 is a schematic diagram of a 2D/3D switching stereoscopic image display apparatus including an acousto-optic element array, according to an exemplary embodiment.

FIG. 10 is a schematic diagram of a 2D/3D switching stereoscopic image display apparatus including an acousto-optic element array, according to an exemplary embodiment.

As shown in FIG. 10, a display apparatus 1000 is an application of the acousto-optic element array 200 according to the above-described exemplary embodiments. For example, the acousto-optic element arrays according to the above-described exemplary embodiments may be adopted as a pixel array of a display panel 1010. The display apparatus 1000 may display an image by adjusting at least one selected from the group consisting of an exit direction, a phase, and intensity of a light beam emitted frontward from a plurality of acousto-optic generators arranged two-dimensionally in the display panel 1010.

The acousto-optic element array 200 may be controlled by an exit direction and intensity of the light beam L and a magnitude and phase of the first and second acoustic waves. Therefore, the display panel 1010 may function as a multi-direction 3D display panel and only the intensity of the light beam L may be selectively controlled. Therefore, the display apparatus 1000, in which the acousto-optic element array according to the above-described exemplary embodiments is adopted as the display panel 1010, may become a two-dimensional/three-dimensional (2D/3D) switching stereoscopic image display apparatus.

In addition, the acousto-optic element array 200 may function as an optical modulator capable of a phase modulation. Therefore, by supplying the first and second wave transducers 150 and 170 with computer generated hologram (CGH) as electrical signals, the display apparatus 1000, in which the acousto-optic element array according to the above-described exemplary embodiments is adopted as the display panel 1010, may become a 2D/3D switching stereoscopic image display apparatus.

On the other hand, as described above, the acousto-optic element array 200 may be implemented in a flat plate type. Hence, the display panel using such an acousto-optic element array 200 also may be a flat plate type panel, and the display apparatus 1000 also may be a flat plate type display apparatus.

According to an exemplary embodiment, the display apparatus 1000 may display a 2D image in a manner such that a single field of vision is formed by adjusting an exit direction of the light beam emitted from the display panel 1010.

According to another exemplary embodiment, the display apparatus 1000 may display a 3D image in a manner such that at least two fields of vision are formed by adjusting an exit direction of the light beam emitted from the display panel 1010.

According to another exemplary embodiment, the display apparatus 1000 may switch between displaying a 2D image and a 3D image by selectively adjusting an exit direction of the light beam emitted from the display panel 1010.

According to another exemplary embodiment, the display apparatus 1000 may display a multi-view 3D image in a manner such that at least two fields of vision are formed on up/down/left/right sides, respectively, by adjusting an exit direction of the light beam emitted from the display panel 1010.

According to another exemplary embodiment, the display apparatus 1000 may be a holographic display apparatus that displays a hologram image by modulating an exit direction and a phase of the light beam emitted from the display panel 1010.

Figure 11:
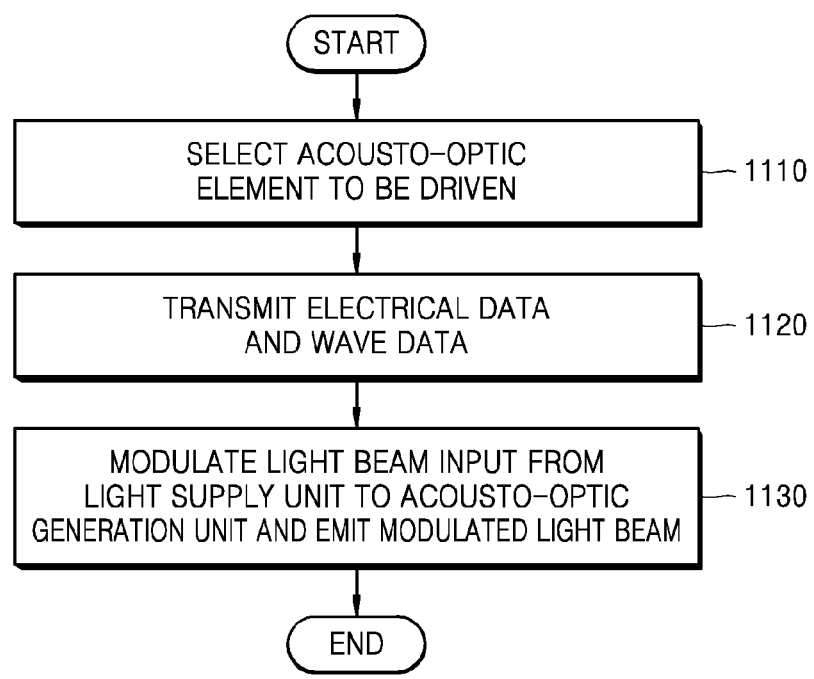
FIG. 11 is a flowchart of a method of driving an acousto-optic element array, according to an exemplary embodiment.

FIG. 11 is a flowchart of a method of driving an acousto-optic element array, according to an exemplary embodiment.

In operation 1110, an acousto-optic element array 200 may select an acousto-optic element to be driven from among acousto-optic elements each including an acousto-optic generator, a light supply, and a wave transducer.

The acousto-optic element array 200 may sequentially activate and drive the acousto-optic elements at each of scan lines of the acousto-optic element array.

In operation 1120, the acousto-optic element array 200 may transmit electrical data and wave data to the selected acousto-optic element.

Electrical data may be transmitted to an electro-optic modulator that controls the acousto-optic generator of the selected acousto-optic element. In addition, the acousto-optic element array 200 may be connected to a waveguide and transmit wave data to the wave transducer of the selected acousto-optic element.

In operation 1130, the acousto-optic element array 200 may emit a light beam, which is input from the light supply to the acousto-optic generator, in a frontward direction of the acousto-optic generator by modulating the light beam by using an acoustic wave applied to the acousto-optic generator from the wave transducer.

According to an exemplary embodiment, the acousto-optic element array structure may rapidly and accurately drive a display operated using a wave, such as a meta-optic display or an acousto-optic display. The structure for driving the large-sized acousto-optic element array using transistor switches may be used for applying the acousto-optic element array structure according to the exemplary embodiment to an ultra high definition television (UHDTV), a super high vision (SHV), or a hologram. In addition, costs may be reduced through the sharing and the distributed arrangement of the electrical wires and the waveguides included in the acousto-optic element array. Furthermore, by using the on/off light source such as a self-luminous device, the transistor switches may be eliminated. Moreover, by appropriately controlling the light supply through the transistor switches and the gate driver, it is possible to implement a driving structure that reduces a loading time and power at the same time.

The devices according to the present exemplary embodiments may include a processor, a memory storing and executing program data, a permanent storage such as a disk drive, a communication port communicating with an external device, and a user interface such as a touch panel, a key, or a button.

In addition, other exemplary embodiments can also be implemented through computer readable code/instructions in/on a medium, e.g., a computer readable medium, to control at least one processing element to implement any above described exemplary embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

Disclosed exemplary embodiments may be described in terms of functional block components and various processing steps. Such functional blocks may be realized by any number of hardware and/or software components configured to perform the specified functions. For example, the exemplary embodiments may employ various integrated circuit components (e.g., memory elements, processing elements, logic elements, look-up tables, and the like) that may carry out a variety of functions under the control of one or more processors or other control devices. Similarly, where the elements of the exemplary embodiments are implemented using software programming or software elements, the exemplary embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the exemplary embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the exemplary embodiments and does not pose a limitation on the scope of this disclosure unless otherwise claimed. In view of this disclosure, numerous modifications and adaptations will be readily apparent to those skilled in this art without departing from the spirit and scope of this disclosure.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope as defined by the following claims.

What is claimed is:

1. An acousto-optic element array comprising:
   acousto-optic elements each including an acousto-optic generator, a light supply, and a wave transducer;
   a gate driver configured to select at least one acousto-optic element to be driven from among the acousto-optic elements;
   an electrical data driver configured to transmit electrical data to an electro-optic modulator configured to control the acousto-optic generator of the at least one selected acousto-optic element through an electrical wire connected to the electrical data driver; and
   a wave data driver configured to transmit wave data to the wave transducer of the at least one selected acousto-optic element through a waveguide connected to the wave data driver,
   wherein the light supply is configured to input a light beam to the acousto-optic generator in a first direction and
   the wave transducer comprises:
   a first wave transducer configured to apply a first acoustic wave to the acousto-optic generator in a second direction; and
   a second wave transducer configured to apply a second acoustic wave to the acousto-optic generator in a third direction.

2. The acousto-optic element array of claim 1, wherein the wave data driver comprises:
   a first wave data driver configured to transmit wave data generated by a first wave generator to the first wave transducer of the at least one selected acousto-optic element through a first waveguide connected to the first wave data driver; and
   a second wave data driver configured to transmit wave data generated by a second wave generator to the second wave transducer of the at least one selected acousto-optic element through a second waveguide connected to the second wave data driver.

3. The acousto-optic element array of claim 1, wherein the electrical data driver is configured to transmit the electrical data to the electro-optic modulator through a transistor switch connected to the electrical wire.

4. The acousto-optic element array of claim 1, wherein the wave data driver is configured to transmit the wave data to the wave transducer through a transistor switch connected to the waveguide.

5. The acousto-optic element array of claim 1, wherein the wave data driver includes:
   a first wave data driver that is connected to a first waveguide to transmit first wave data, which is generated by a first wave generator, to the first wave transducer of a first acousto-optic element among the at least one selected acousto-optic element for a first time period, and transmit second wave data, which is generated by the first wave generator, to the second wave transducer of a second acousto-optic element adjacent to the first acousto-optic element for a second time period; and
   a second wave data driver that is connected to a second waveguide to transmit third wave data, which is generated by a second wave generator, to the second wave transducer of the first acousto-optic element for the first time period, and transmit fourth wave data, which is generated by the second wave generator, to the first wave transducer of a third acousto-optic element adjacent to the first acousto-optic element for the second time period.

6. The acousto-optic element array of claim 5, wherein the first wave data driver is further configured to transmit the first wave data to the first wave transducer through the first waveguide, and the second wave data driver is further configured to transmit the second wave data to the second wave transducer through the second waveguide.

7. The acousto-optic element array of claim 5, wherein the gate driver is further configured to drive the first acousto-optic element for the first time period and drive the second acousto-optic element and the third acousto-optic element for the second time period.

8. The acousto-optic element array of claim 1, wherein, the light supply comprises a light source, and
the gate driver is further configured to control whether to turn on or off the light supply.

9. The acousto-optic element array of claim 8, wherein the electrical data driver is further configured to transmit the electrical data to the electro-optic modulator through a transistor switch connected to the electrical wire.

10. The acousto-optic element array of claim 8, wherein the wave data driver is configured to transmit the wave data to the wave transducer through a transistor switch connected to the waveguide.

11. A display apparatus comprising:
a display panel comprising an acousto-optic element array comprising acousto-optic elements each including an acousto-optic generator, a light supply, and a wave transducer;
a gate driver configured to select at least one acousto-optic element to be driven from among the acousto-optic elements;
an electrical data driver configured to transmit electrical data to an electro-optic modulator configured to control the acousto-optic generator of the at least one selected acousto-optic element through an electrical wire connected to the electrical data driver; and
a wave data driver configured to transmit wave data to the wave transducer of the at least one selected acousto-optic element through a waveguide connected to the wave data driver,
wherein the display apparatus is configured to display an image by adjusting at least one selected from a group consisting of an exit direction, a phase, and intensity of a light beam emitted frontward from a plurality of acousto-optic generators, including the acousto-optic generator, which are arranged two-dimensionally in the display panel, and
wherein the light supply is configured to input the light beam to the acousto-optic generator in a first direction, and
the wave transducer comprises:
a first wave transducer configured to apply a first acoustic wave to the acousto-optic generator in a second direction; and
a second wave transducer configured to apply a second acoustic wave to the acousto-optic generator in a third direction.

12. The display apparatus of claim 11, wherein the display apparatus is further configured to display a two-dimensional (2D) image such that a single field of vision is formed by adjusting the exit direction of the light beam emitted from the display panel.

13. The display apparatus of claim 11, wherein the display apparatus is further configured to display a three-dimensional (3D) image in a manner such that at least two fields of vision are formed by adjusting the exit direction of the light beam emitted from the display panel.

14. The display apparatus of claim 11, wherein the display apparatus is further configured to switch between displaying a 2D image and a 3D image by selectively adjusting the exit direction of the light beam emitted from the display panel.

15. The display apparatus of claim 11, wherein the display apparatus is further configured to display a multi-view 3D image in a manner such that at least two fields of vision are formed on each of a top side, a bottom side, a left side, and a right side of the display apparatus, by adjusting the exit direction of the light beam emitted from the display panel.

16. The display apparatus of claim 11, wherein the display apparatus is a holographic display apparatus that displays a hologram image by modulating the exit direction and the phase of the light beam emitted from the display panel.

17. A method of driving an acousto-optic element array, the method comprising:
selecting an acousto-optic element to be driven from among acousto-optic elements each including an acousto-optic generator, a light supply, and a wave transducer;
transmitting electrical data to an electro-optic modulator that controls the acousto-optic generator of the selected acousto-optic element;
transmitting wave data to the wave transducer of the selected acousto-optic element through a waveguide; and
emitting a light beam to the selected acousto-optic element, which is input from the light supply to the acousto-optic generator, in a frontward direction of the acousto-optic generator by modulating the light beam by using an acoustic wave applied to the acousto-optic generator from the wave transducer,
wherein the light supply is configured to input the light beam to the acousto-optic generator in a first direction, and
the wave transducer comprises;
a first wave transducer configured to apply a first acoustic wave to the acousto-optic generator in a second direction; and
a second wave transducer configured to apply a second acoustic wave to the acousto-optic generator on a third direction.

* * * * *